(12) United States Patent
Peng et al.

(10) Patent No.: US 7,428,144 B2
(45) Date of Patent: Sep. 23, 2008

(54) PORTABLE ELECTRONIC APPARATUS HAVING IMPROVED LATCH MECHANISM

(75) Inventors: Wen-Tang Peng, Tu-Cheng (TW); Guang-Yi Zhang, Shenzhen (CN); Jiang-Ping Zhu, Shenzhen (CN); Shao-Kun Chen, Shenzhen (CN)

(73) Assignees: Hong Fu Jin Precision Industry (Shenzhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 474 days.

(21) Appl. No.: 11/143,816

(22) Filed: Jun. 2, 2005

(65) Prior Publication Data
US 2006/0082962 A1 Apr. 20, 2006

(30) Foreign Application Priority Data
Oct. 14, 2004 (CN) .......................... 2004 2 0094084

(51) Int. Cl.
*G06F 1/16* (2006.01)
(52) U.S. Cl. ................... 361/683; 361/732; 312/223.2
(58) Field of Classification Search ......... 361/679–683, 361/732; 312/223.1, 223.2
See application file for complete search history.

(56) References Cited

U.S. PATENT DOCUMENTS

| 5,253,142 A * | 10/1993 | Weng .................... 361/681 |
| 5,465,191 A * | 11/1995 | Nomura et al. ............. 361/681 |
| 6,115,239 A | 9/2000 | Kim |
| 6,570,757 B2 * | 5/2003 | DiFonzo et al. ............. 361/683 |
| 7,181,238 B2 * | 2/2007 | Chiang .................... 455/556.1 |
| 7,256,987 B2 * | 8/2007 | Weng .................... 361/683 |
| 2003/0048600 A1 | 3/2003 | Hsu et al. |

* cited by examiner

*Primary Examiner*—Jayprakash N Gandhi
*Assistant Examiner*—Anthony Q Edwards
(74) *Attorney, Agent, or Firm*—Morris Manning Martin LLP; Tim Tingkang Xia, Esq.

(57) ABSTRACT

A portable computer includes a base unit (70), and a display unit (10) pivotally connected to the base unit for movement between a closed position and an open position. A pair of hooks (11) is arranged on the display unit, each hook including a latching portion (113). A pair of catches (571) is arranged on the base unit and movable with respect to the hooks, each catch including a free end which snappingly engages the latching portion of a corresponding hook to attach the display unit to the base unit at the closed position. The latching portion of each hook defines an arcuate surface (574) along which each hook drives a corresponding catch to disengage from each other during movement of the display unit from a closed position to an open position.

9 Claims, 7 Drawing Sheets

PORTABLE ELECTRONIC APPARATUS HAVING IMPROVED LATCH MECHANISM

BACKGROUND OF THE INVENTION

1. Field of the Invention

The present invention relates to a portable electronic apparatus, and more particularly to a portable computer which has improved latch mechanism.

2. Background of the Invention

Portable computers, such as laptop computers and notebook computers, have become increasingly popular for general use. The computers of this type includes a base unit supporting a keyboard and necessary hardware such as a central processing unit (CPU), and a display unit pivotally mounted on the base unit for movement between a closed position when not in use and an open position when in use. The display unit generally supports a flat type of display such as a liquid crystal display (LCD) and is foldable onto the base unit.

The display unit is typically attached to the base unit via a latch mechanism when the portable computer is not in use. A typical latch mechanism may be constructed by having a hook member operatively connected to a knob for permitting movement between a latched position when the display unit is folded down on the base unit and the hook member latches to a corresponding hook groove defined in the base unit, and a released position when the hook member is released from the corresponding hook groove to be ready for opening the display unit.

With rapid development of portable computer industry, today's manufacturers are facing more intense competition than ever before, effective control of production cost is necessary and vital for manufactures to win in a future fierce price war. Every part constituting a portable computer, such as a knob, a screw, has been taken into account for cutting cost. However, the knob to manipulate aforesaid latch mechanism in the typical portable computer is essentially required. What is desired, therefore, is a portable computer which eliminates use of a knob in its latch mechanism. Moreover, the knob in the typical portable computer is arranged on a visible position for facilitates manipulation of a user. Such arrangement of the knob may compromise appearance of the portable computer. What is also needed, therefore, is a portable computer having pleasing appearance.

SUMMARY OF THE INVENTION

In one preferred embodiment, a portable computer includes a base unit, and a display unit pivotally connected to the base unit for movement between an open position and a closed position. A pair of hooks is arranged on the display unit, each hook including a latching portion. A pair of catches is arranged on the base unit and movable with respect to the hooks, each catch including a free end which snappingly engages the latching portion of a corresponding hook to attach the display unit to the base unit at the closed position. The latching portion of each hook defines an arcuate surface along which each hook drives a corresponding catch to disengage from each other during the movement of the display unit from the closed position to the open position. In another preferred embodiment, the free end of each catch defines an arcuate surface along which a corresponding hook drives each catch to disengage from each other during the movement of the display unit from the closed position to the open position.

The display unit of the portable computer disclosed in the preferred embodiments is gradually opened while the hook of the display unit disengages from the catch of the base unit. The portable computer enables the display unit to be opened from the base unit without use of a typical knob. Therefore, production cost of the portable computer is reduced, and the appearance of the portable computer is immune from impairment resulting from the knob.

Other advantages and novel features of the invention will become more apparent from the following detailed description of preferred embodiments when taken in conjunction with the accompanying drawings, in which:

DETAILED DESCRIPTION OF THE INVENTION

Figure 1:
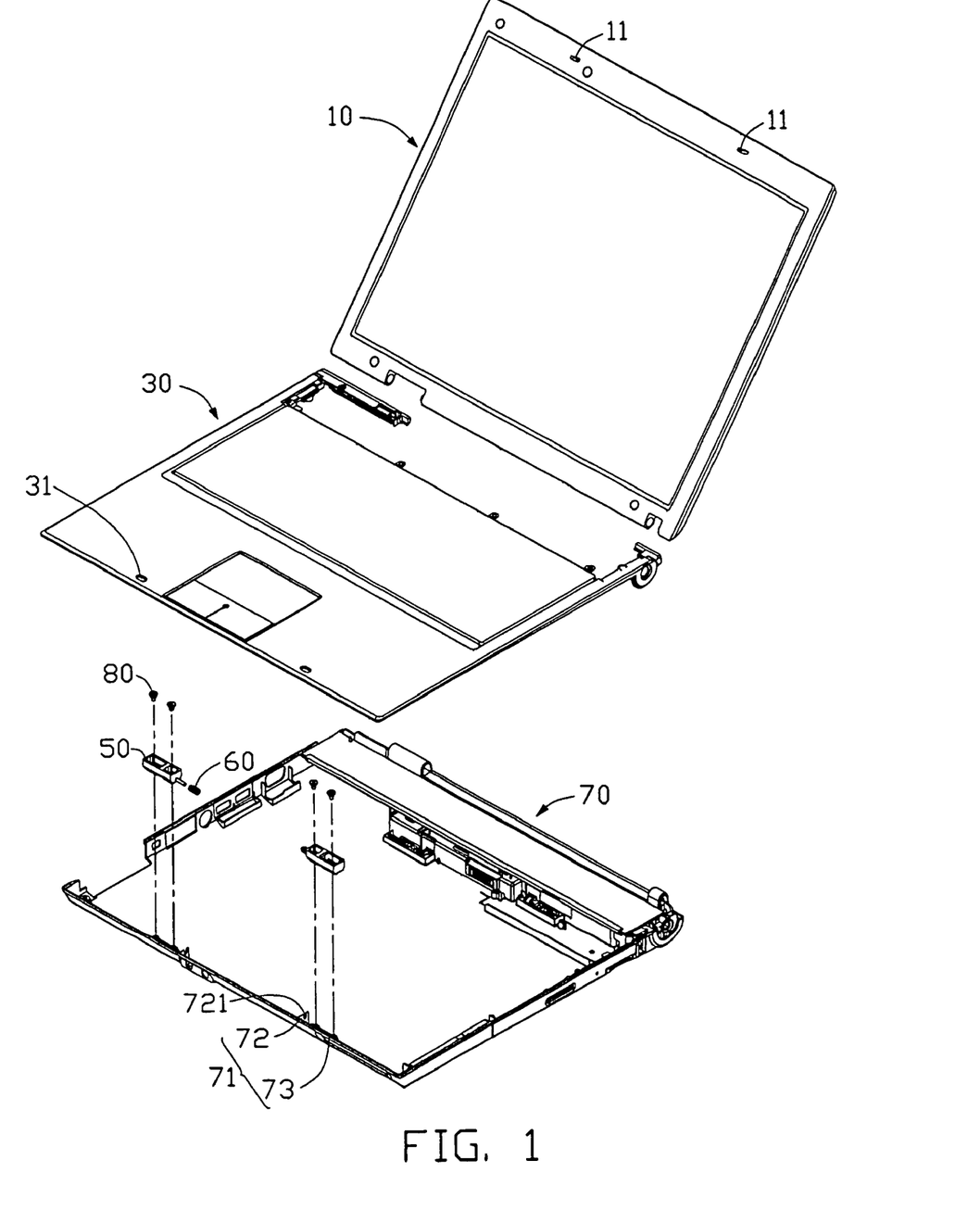
FIG. 1 is an exploded, isometric view of a portable computer in accordance with a first preferred embodiment of the present invention.

Referring to FIG. 1, an electronic device like a portable computer includes a base unit 70 and a display unit 10 pivotally attached to a rear end of the base unit 70 for movement between an open and a closed position. The base unit 70 is for receiving a plurality of necessary components which cooperate with each other to provide computing function. The base unit 70 includes a top side wall 30 to protect the components.

A pair of horizontally spaced hooks 11 is arranged on a front portion of the display unit 10 as one engagement means. Each hook 11 includes an actuating portion 111 and a latching portion 113. In a first preferred embodiment shown in FIGS. 4-6, the actuating portion 111 is a slanted planar surface stretching slantingly downward from an end portion of the hook 11, and the latching portion 113 is an arcuate surface extending generally upwardly from the end portion of the hook 11. The actuating portion 111 and the latching portion 113 are arranged on opposite sides of the end portion of the hook 11.

Two horizontally spaced through holes 31 are defined in a front edge portion of the top cover 30, corresponding to the hooks 11 of the display unit 10. A cursor control device, such as a touchpad, is disposed adjacent the front edge portion between the through holes 31.

Figure 4:
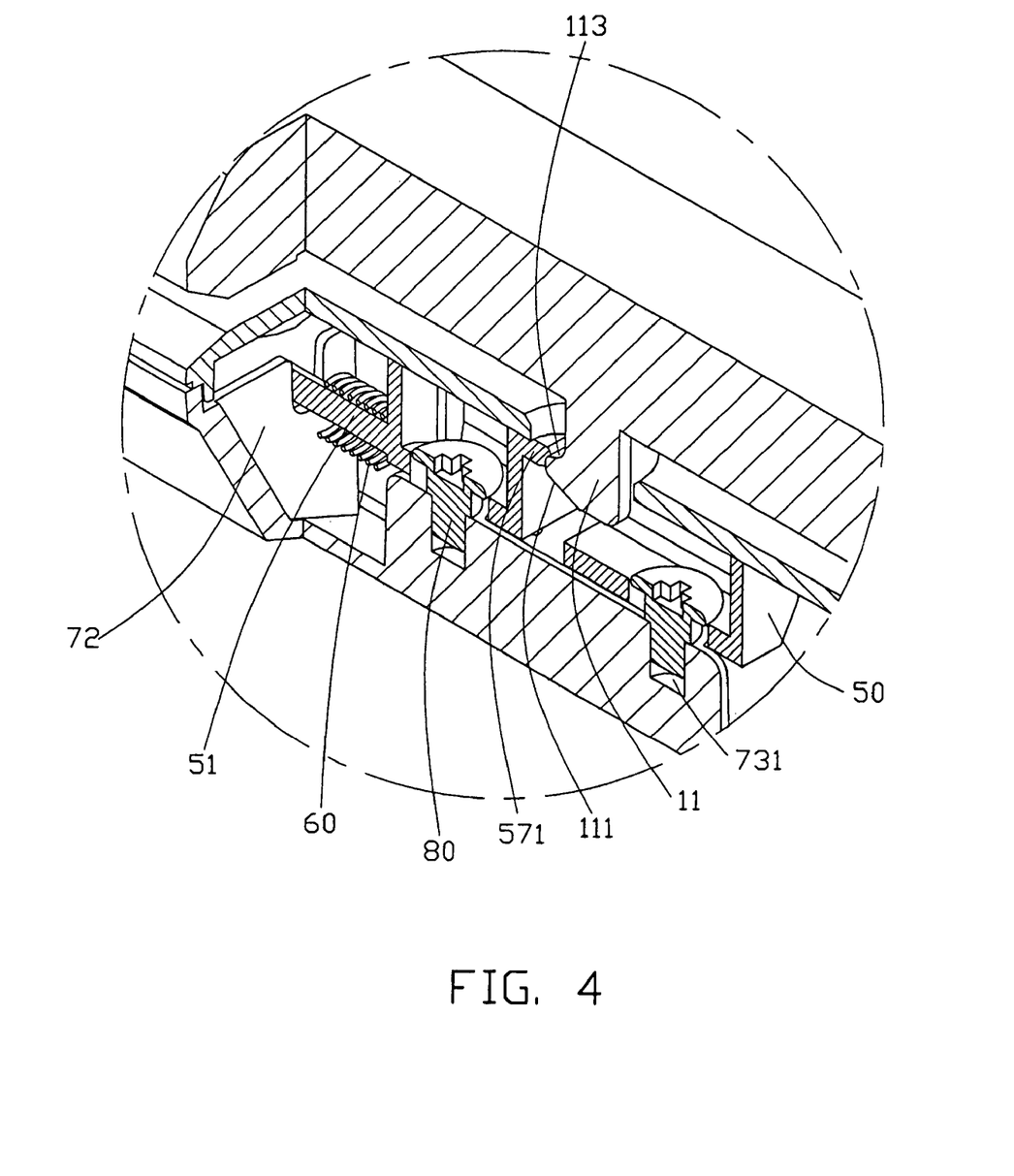
FIGS. 4 and 5 are enlarged views of an encircled portion IV of FIG. 3.

Referring to FIGS. 1 and 4, two sets of retention apparatuses 71 are arranged inside the base unit 70. Each set of retention apparatus 71 includes a tab 72 extending inwardly from a front wall of the base unit 70, and a seat 73 extending along the front wall and spaced apart from the tab 72. A notch 721 is formed in a top edge portion of the tab 72. A pair of spaced threaded holes 731 is defined in the seat 73.

Figure 2:
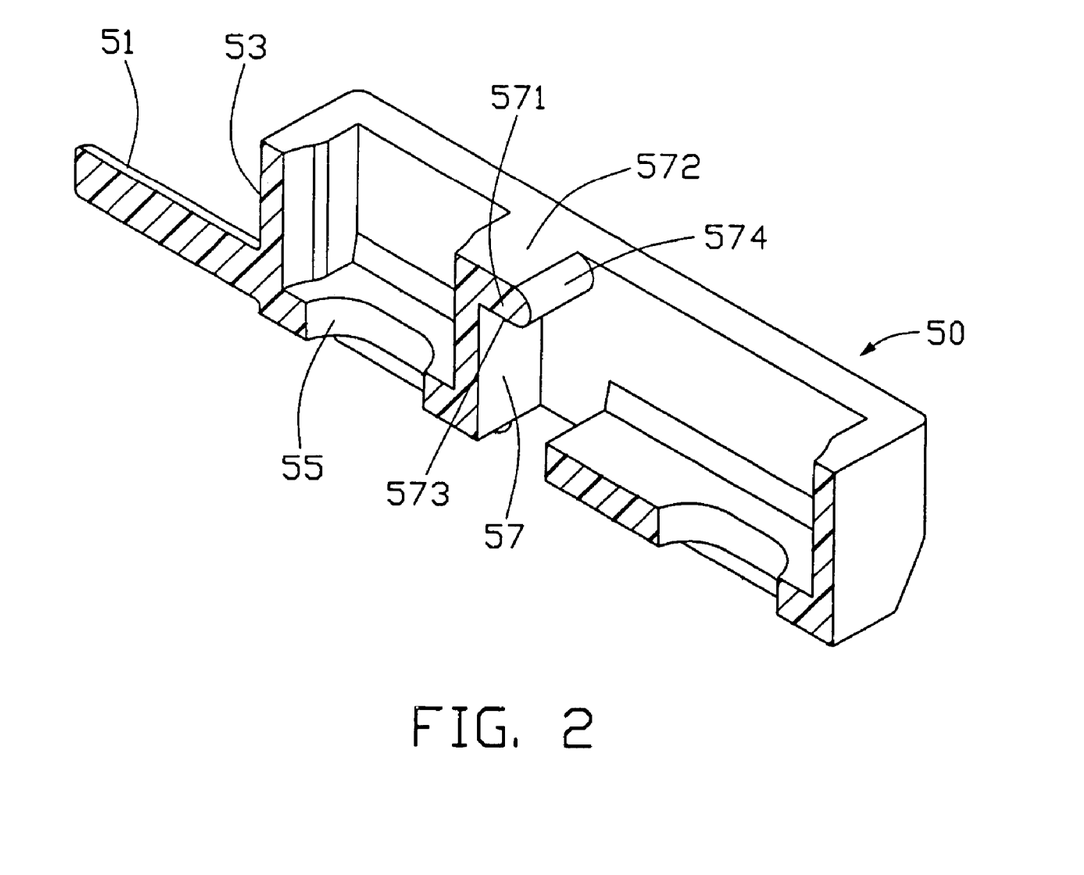
FIG. 2 is a cross-sectional view of a bracket shown in FIG. 1.

Two brackets 50 are provided to mate with the hooks 11 of the display unit 10 respectively. The brackets 50 are attached to the retention apparatuses 71 of the base unit 70 respectively with screws 80. Referring to FIG. 2, each bracket 50 includes a post 51 extending outwardly from an end surface of a surrounding wall 53 thereof. An internal partition wall 57 divides the bracket 50 into two spaces. A catch 571 as another engagement means protrudes from the partition wall 57 in one space distal from the post 51. The catch 571 includes an upper surface 572, and a lower surface 573. A free end of the catch 571 forms an arcuate end surface 574 which smoothly connects between the upper and lower surfaces 572, 573. Two slots 55 are defined in bottom surfaces of the spaces respectively.

Figure 3:
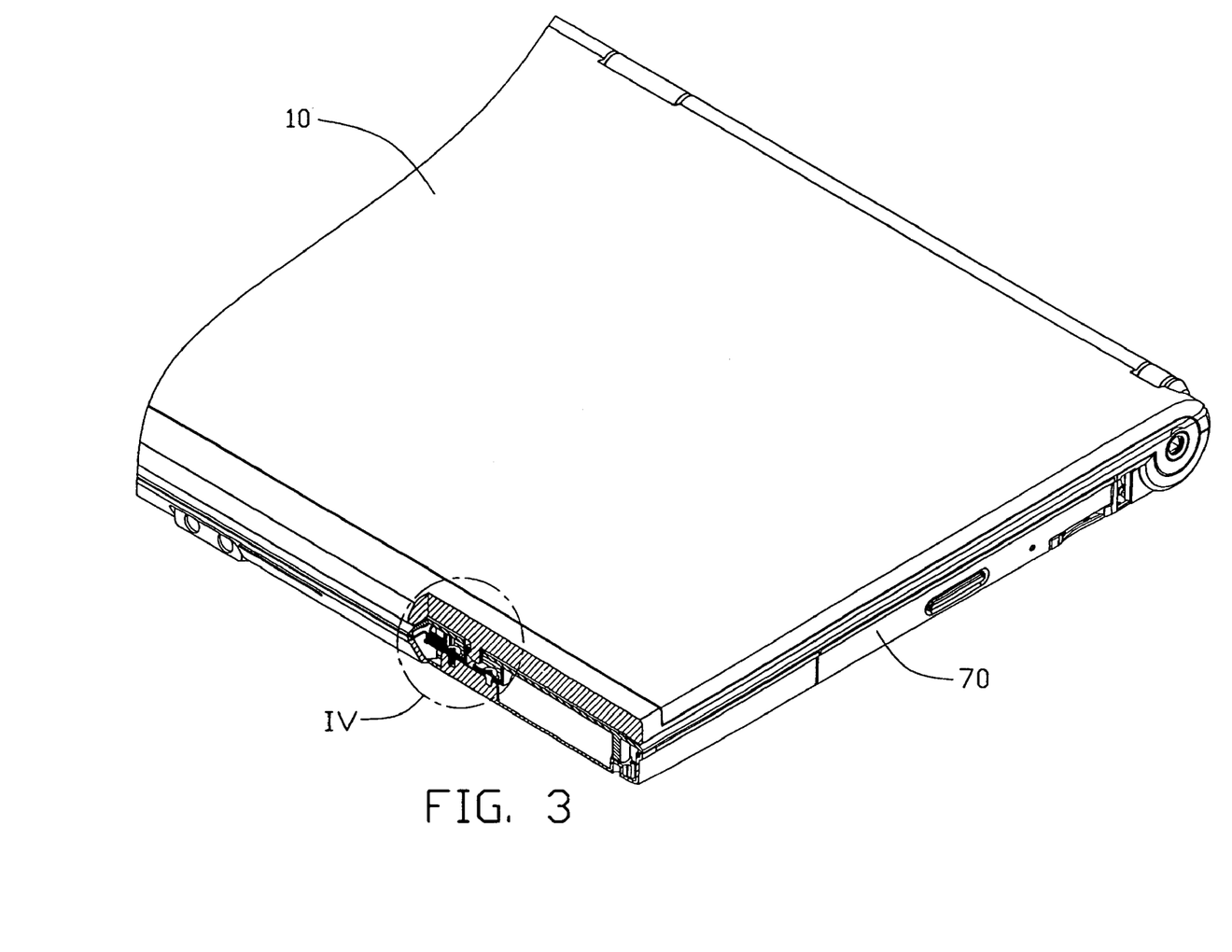
FIG. 3 is a partially cross-sectional, assembled view of FIG. 1, showing the portable computer is closed.

As shown in FIGS. 3 and 4, the brackets 50 are placed on corresponding seats 73 of the base unit 70. The posts 51 of the brackets 50 are supported at the notches 721 of the tabs 72 respectively. A pair of coil springs 60 is retained between corresponding tabs 72 and brackets 50 respectively, with the posts 51 of corresponding brackets 50 extended therethrough. Two screws 80 are inserted through the slots 55 of each bracket 50 and engage in the threaded holes 731 of corresponding seat 73 respectively, the bracket 50 is thereby slidably attached to the seat 73.

When the display unit 10 is pivotally folded toward the base unit 70 from the open position to the closed position, the hooks 11 extend through the through holes 31 of the top cover 31 and contact the catches 571 of the brackets 50 respectively. The actuating portions 111 of the hooks 11 rest on the end surfaces 574 of the catches 571 of the brackets 50 respectively. Referring particularly to FIG. 4, the display unit 10 is further folded to contact the top cover 30 of the base unit 70. During the movement of the display unit 10, the actuating portions 111 of the hooks 11 drive corresponding catches 571 at the end surfaces 574 to move along the seats 73 toward corresponding tabs 72. The coil springs 60 are compressed.

Figure 5:
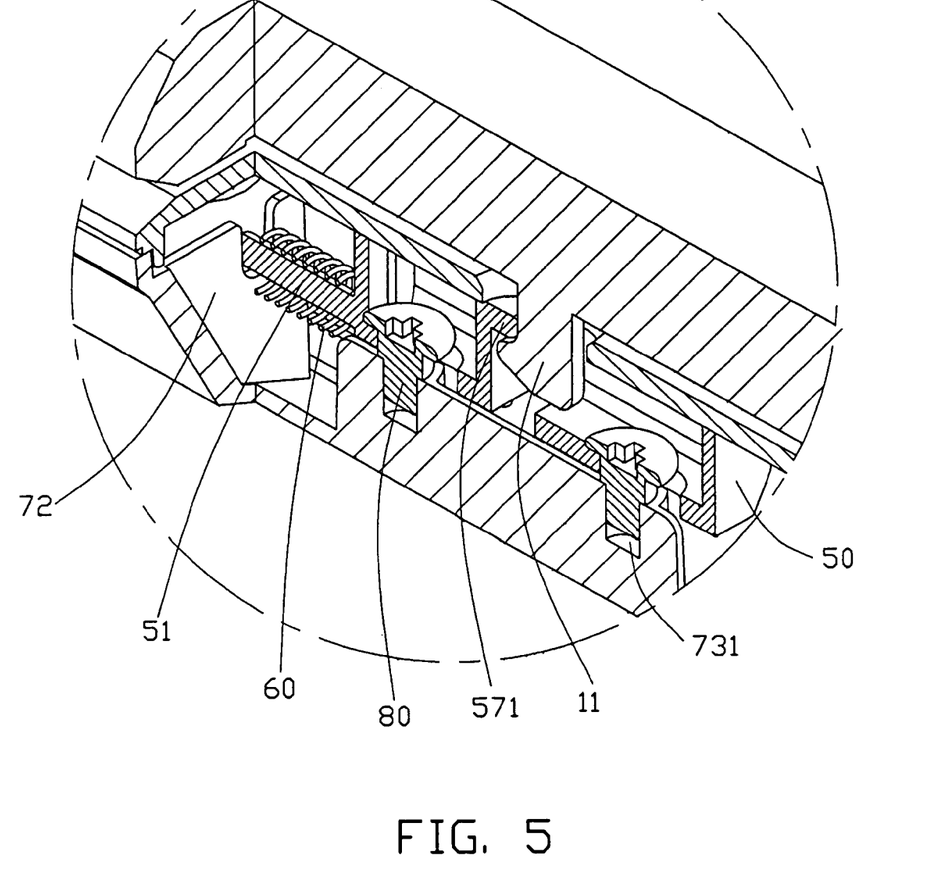
Figure 6:
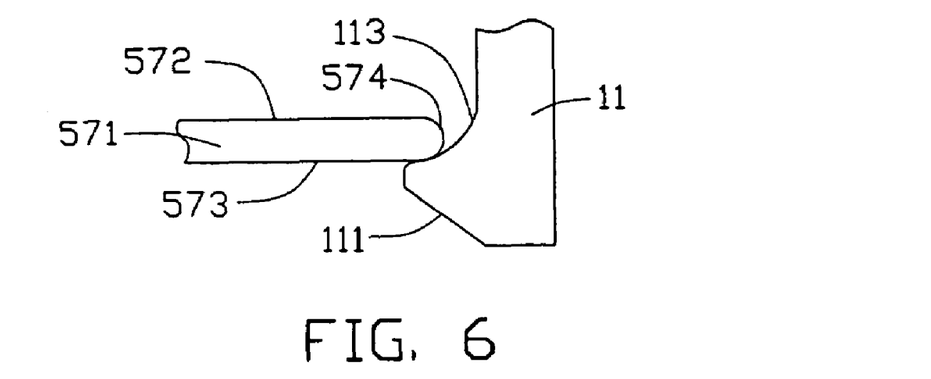
FIG. 6 is a schematic view of the first preferred embodiment, showing a latch engaging a hook.

Referring to FIGS. 5 and 6, after the end portions of the hooks 11 get over the free ends of the catches 571 of corresponding brackets 50, the coil springs 60 retract to push the brackets 50 at the surrounding walls 53 respectively toward corresponding hooks 11. The catches 571 snappingly come in engagement with the latching portions 113 of the end portions of hooks 11 respectively at the end surfaces 574 adjacent the lower surfaces 573. The display unit 10 is thus attached to the base unit 70.

In need of using the portable computer, the display unit 10 is pulled apart from the base unit 70, the latching portions 113 of the hooks 11 slide along the end surfaces 574 of corresponding catches 571 and simultaneously urge corresponding brackets 50 away toward the tabs 72.

Figure 7:
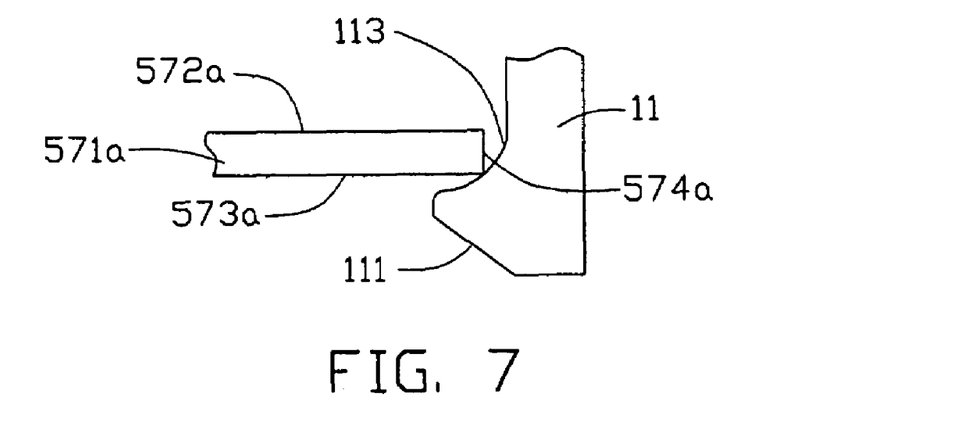
FIGS. 7 to 10 are schematic views respectively showing a latch engaging a hook from a second preferred embodiment to a fifth preferred embodiment.

In a second embodiment, as shown in FIG. 7, a catch 571*a* includes an upper surface 572*a*, a lower surface 573*a* and a planar end surface 574*a* which connects between the upper and lower surfaces 572, 573. The latching portion 113 of the hook 11 engages a common edge shared by the lower surface 573*a* and the end surface 574*a*.

Figure 8:
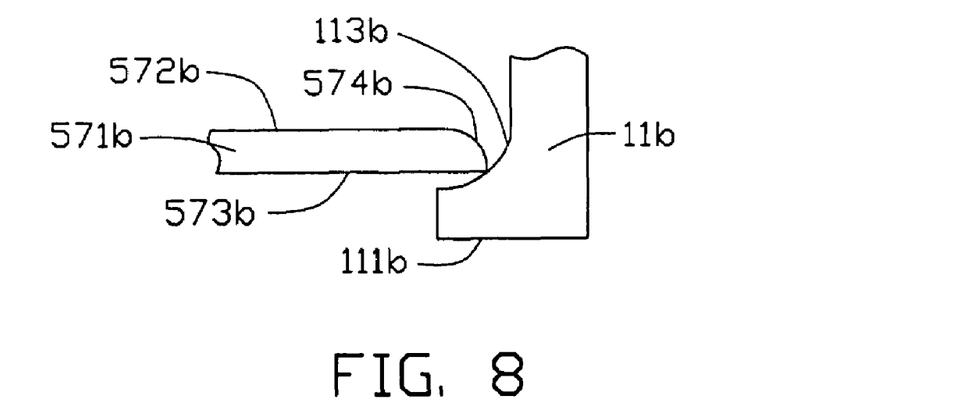

As a third embodiment, FIG. 8 shows a catch 571*b* to engage a hook 11*b*. The catch 571*b* includes an upper surface 572*b*, a lower surface 573*b* and an arcuate end surface 574*b* which smoothly extends from the upper surface 572*b* and ends to form a relatively sharp corner with the lower surface 573*b*. The hook 11*b* includes an arcuate latching portion 113*b* for engaging the relatively sharp corner of the catch 571*b* to attach the display unit 10 to the base unit 70, and a horizontally planar actuating portion 111*b* to actuate the catch 571*b*.

Figure 9:
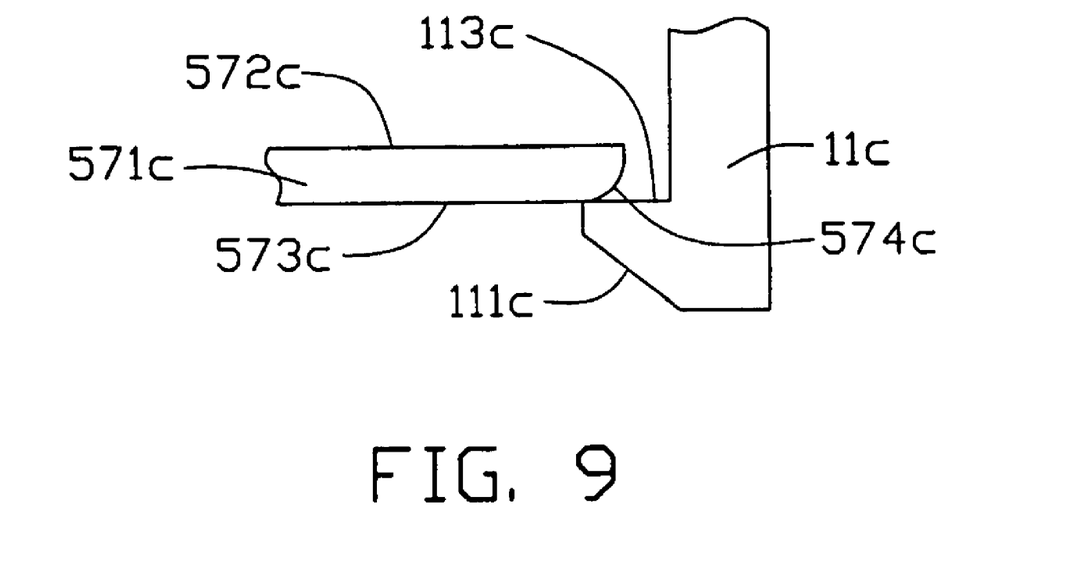

FIG. 9 shows a fourth embodiment, a catch 571*c* includes an upper surface 572*c*, a lower surface 573*c* and an arcuate end surface 574*c* which smoothly extends from the lower surface 573*c* and intersects with the upper surface 572*c* to form a relatively sharp corner therebetween. Correspondingly, a hook 11*c*, which includes a horizontally planar latching portion 113*c* for engaging a common edge portion shared by the lower surface 573*c* and the end surface 574*c* to attach the display unit 10 to the base unit 70, and an slanted planar actuating portion 111*b* to actuate the catch 571*b*, is provided.

Figure 10:
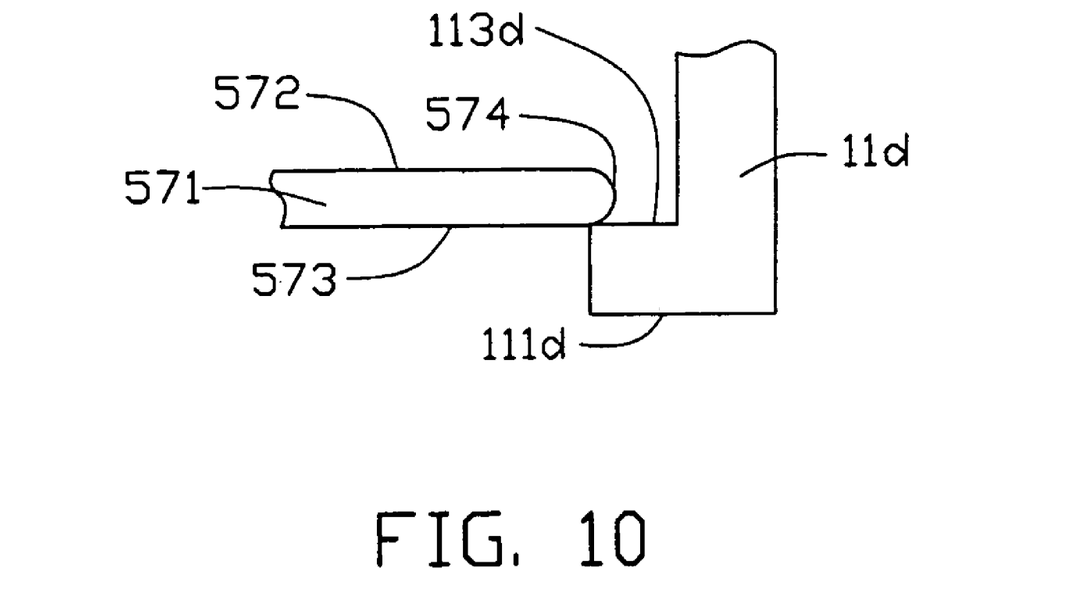

FIG. 10 shows a fifth embodiment, corresponding to the catch 571 described in the first embodiment, a hook 11*d* is provided. The hook 11*d* includes a horizontally planar actuating portion 111*d* and a horizontally planar latching portion 113*d* to engage the end surface 574 of the catch 571.

It is believed that the present invention and its advantages will be understood and apparent that various changes may be made thereto without departing from the spirit and scope of the invention or sacrificing all of its material advantages, the examples hereinbefore described merely are preferred or exemplary embodiments of the invention.

What is claimed is:

1. A portable computer comprising:
   a base unit;
   a display unit pivotally connected to the base unit for movement between an open position and a closed position;
   a hook arranged from one of the display unit and the base unit, the hook comprising a latching portion; and
   a catch arranged from the other of the display unit and the base unit and movable with respect to the hook, the catch comprising a free end which snappingly engages the latching portion of the hook to attach the display unit to the base unit at the closed position;
   the latching portion of the hook defining an arcuate surface along which the hook drives the catch to disengage from each other during the movement of the display unit from the closed position to the open position, the free end of the catch defining an arcuate end surface which smoothly connects to the upper surface and forms a relatively sharp corner with the lower surface, the latching portion of the hook engaging the relatively sharp corner at the closed position.

2. The portable computer as claimed in claim 1, wherein the hook further comprises an actuating portion opposite to the latching portion, and the actuating portion defines a horizontally planar surface or a slanted surface to drive the arcuate end surface of the free end of the catch adjacent the upper surface during the movement of the display unit from the open position to the closed position.

3. The portable computer as claimed in claim 1, wherein the catch is a movably spring-loaded catch.

4. A portable computer comprising:
   a base unit, a spring-loaded catch movably arranged inside the base;
   a display unit pivotally attached to the base unit for movement between an open position and a closed position, a hook mounted to the display unit and securing the display unit to the base unit at the closed position by means of interlocking with the catch; and
   means for disengaging the hook from the catch during the course of the display being moved from the closed position to the open position;
   wherein the disengaging means comprises an arcuate surface defined at the hook along which the hook moves with respect to the catch to disengage from each other from the closed position to the open position, the latch defines an end surface and a lower surface which cooperatively form a relatively sharp corner to interlock with the arcuate surface of the hook at the closed position.

5. The portable computer as claimed in claim 4, wherein the base further comprises a bracket movably attached to the base unit via a retention apparatus, and the catch is formed from the bracket.

6. The portable computer as claimed in claim 5, wherein the retention apparatus comprises a seat provided adjacent a front wall of the base unit to support the bracket and a tab spaced apart from the seat, and a coil spring is provided between the tab and bracket.

7. A portable computer comprising:
   a base unit;
   a display unit pivotally connected to the base unit for movement between an open position and a closed position;
   a hook arranged from one of the display unit and the base unit, the hook comprising a latching portion; and
   a catch arranged from the other of the display unit and the base unit and movable with respect to the hook, the catch comprising a free end which snappingly engages the latching portion of the hook to attach the display unit to the base unit at the closed position;
   the free end of the catch defining an arcuate surface along which the hook drives the catch to disengage from each other during the movement of the display unit from the closed position to the open position, the catch defining an upper surface and a lower surface, the arcuate surface of the catch smoothly connecting to each of the upper and lower surfaces, and the latching portion of the hook defining an arcuate surface which engages the arcuate surface of the catch adjacent the lower surface at the closed position.

8. The portable computer as claimed in claim 7, wherein the hook further comprises an actuating portion opposite to the latching portion, and the actuating portion defines a horizontally planar surface to drive the arcuate surface of the free end of the catch adjacent the upper surface during the movement of the display unit from the open position to the closed position.

9. The portable computer as claimed in claim 8, wherein the catch is a movably spring-loaded catch.

* * * * *